United States Patent
Miller et al.

(10) Patent No.: US 6,355,316 B1
(45) Date of Patent: Mar. 12, 2002

(54) DEVICE FOR PROTECTING ELECTRONIC CIRCUITS FROM UNAUTHORIZED ACCESS

(75) Inventors: Norbert Miller; Ulrich Wortelkamp, both of Mönchengladbach (DE)

(73) Assignee: Scheidt & Bachmann GmbH (DE)

( * ) Notice: Subject to any disclaimer, the term of this patent is extended or adjusted under 35 U.S.C. 154(b) by 0 days.

(21) Appl. No.: 09/566,024

(22) Filed: May 8, 2000

(30) Foreign Application Priority Data

May 15, 1999 (EP) .............................................. 99109663

(51) Int. Cl.[7] ................................................ A47G 1/12

(52) U.S. Cl. .............................. 428/13; 428/14; 428/68

(58) Field of Search .............................. 428/13, 14, 68, 428/75, 76; 365/228, 52, 244; 380/3, 52

(56) References Cited

U.S. PATENT DOCUMENTS 4,811,288 A  3/1989  Kleijne et al. ................ 365/52

FOREIGN PATENT DOCUMENTS

EP  0 495 645 A1  7/1992

*Primary Examiner*—Deborah Jones
*Assistant Examiner*—Abraham Bahta
(74) *Attorney, Agent, or Firm*—Cantor Colburn LLP

(57) ABSTRACT

To improve a device for protecting electronic circuits from unauthorized access so that it can be produced inexpensively, can be handled and guarantees increased security, the invention proposes a device for protecting electronic circuits from unauthorized access with at least one hood-type cover element, which is arranged on a circuit plate covering it at least in some areas and has tracks that can be connected to a detection circuit to detect mechanical damage, wherein the cover element is made of a material that is very hard and at the same time very brittle.

11 Claims, 1 Drawing Sheet

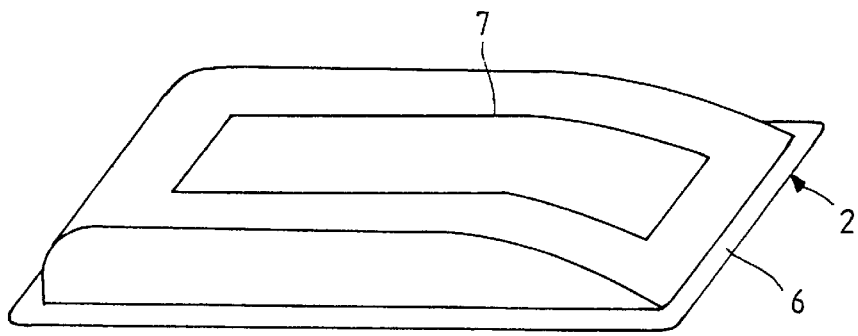
Fig. 1
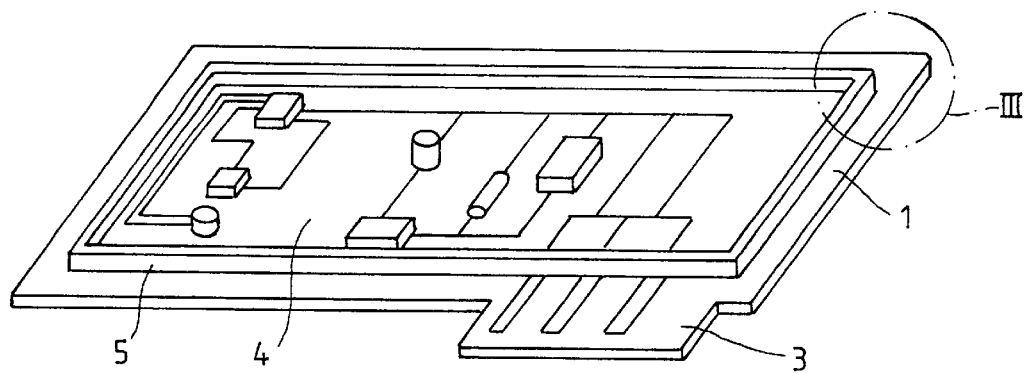
Fig. 2
Fig. 3
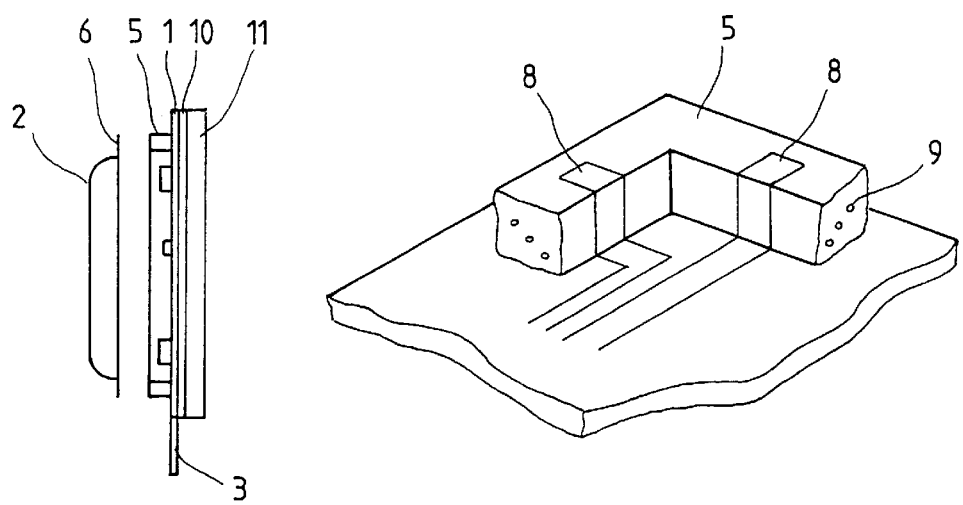

DEVICE FOR PROTECTING ELECTRONIC CIRCUITS FROM UNAUTHORIZED ACCESS

TECHNICAL FIELD

The invention concerns a device for protecting electronic circuits from unauthorized access.

BACKGROUD OF THE INVENTION

On many electronic circuits, i.e., circuits arranged on plates of electric and/or electronic components and printed circuits, it is desirable or necessary, to protect at least some areas from unauthorized access. This is especially true of devices for the sale or goods and/or services like automatic gas pumps, automatic money machines, automatic machines for non-cash payment, for example, and the like. Other applications also include PIN input codes, ec-cash methods, virtual business cards for ec-money cards, etc. In all these cases, the circuits or circuit plates contain modules with confidential data. Thus, for example, in the area of non-cash payment transactions, there are ID cards that are put at places on the plate to be read, and if a chip card is used, they are read out for verification. Many plates have a large number of ID cards, so the device can be used for many cards from different institutions. It is already known how to provide memory modules on plates with codes that can be rewritten via keyboards or even remote data-transfer instead of ID cards.

In all the cases mentioned, unauthorized third parties must be prevented from gaining possession of the confidential data or being able to manipulate it. In both cases, it would be possible for third parties to influence or simulate financial transactions.

It is known how to anneal plates using coverings. The areas with the modules mounted on them are covered and the contact areas on the plate side are left free. For example, there are contacts for connection to a data base system.

The covered areas are usually covered with metal materials. For one thing, pure manipulation by means of lever tools should be prevented, i.e., the plates used for covering should have some resistance to flexure and the like. But spot-drilling should also be prevented or made unnecessary by appropriate measures. It is known how to cover areas to be protected with an arrangement of tracks. In the case of spot-drilling, tracks are destroyed or made to connect with one another so that the corresponding memory modules, ID cards and the like are automatically erased by detection circuits. So further access is useless for that person.

In the past, metal plates were preferably used, because they have the advantage that they can be screwed into the corresponding position, since the area must basically be made accessible again, for example when ID cards are used. On new types of memory units and safety-relevant plates, this is no longer necessary, since the memory modules are accessible, for example via data transfer, terminal emulation or other software measures.

One disadvantage of the conventional protective devices is the relatively high expense due to the use of expensive materials, and others are the basic problem of the place where the plate and the covering are separated, which regularly allows at least the smallest degree of lifting, the weight of the material, the limited possibility of optic design and especially the expense of laying a track covering to protect the holes. Such a track covering either involves high cost to provide a good seal or leaves some areas free and unprotected, which are indirect by technical measurement methods. Thus, resistance measurements, X-ray and infrared methods and the like are used to set the course of the track and to detect the free surfaces that can be spot-drilled. On the other hand, the outer covering material must be specially designed to provide protection, which in turn substantially increases the cost and the tooling possibilities.

SUMMARY OF THE INVENTION

Starting from this state of the art, the problem of this invention is to improve a device for protecting electronic circuits from mechanical damage, electrical or electronic manipulation and hence common types of unauthorized access in such a way that it can be produced and handled inexpensively and guarantees high security.

To solve this technical problem, the invention proposes a device for protecting electronic circuits from unauthorized access with at least one hood-type cover element, which is arranged so it covers a circuit plate in at least some areas and has tracks that can be connected to a detection circuit to detect mechanical damage, wherein the cover element is made of a material that is both very hard and at the same time very brittle.

The invention proposes a new type of cover element, which is very hard and at the same time very brittle, and is guaranteed to break into many pieces if there is mechanical damage. This ensures that that any mechanical manipulation on the cover element itself is detected even with only a small arrangement of tracks.

In one especially advantageous proposal of the invention, the hard and simultaneously brittle material is pre-stressed to increase its internal stress. This causes the material to break into a great number of small, basically uniform pieces when pressure is exerted only at a point some place.

In one advantageous proposal in the invention, the material is glass, preferably tempered glass. However, appropriate plastics, ceramic materials and the like can also be considered as alternatives. The basic property is the combination of hardness and brittleness, which guarantees a completely uncontrolled explosion over a large interlaced area as a result of pressure being exerted. It is not even possible to spot-drill such material in practice.

The tracks can be on the surface of the cover element or embedded in it at least partially. If a hood-type cover element is used that is set on a plate or some part of it like a cap, the tracks are on the side facing the plate. The tracks preferably make contact purely by pressure with the corresponding contacts on the plate. If the cover element is lifted only slightly off the plate or vice versa, a separation is brought about between the track and the contact so that manipulation can be detected. One advantage proposed is that a large number of contact areas for tracks be provided, for example on cover elements with basically angular basic surfaces in all the comer areas. The contact points can be microswitches, Reed contacts, electrically conductive rubber and the like.

One especially advantageous proposal of the invention is a frame projecting from the plate, preferably made of a plate material, which is a frame on which to set a cover element. The frame itself can have tracks or conductive material going through it in order to be able to detect lifting, spot-drilling or the like.

The cover element is preferably attached by means of a plastic frame to the plate. It is an advantage for cover elements to be arranged on both surfaces of a plate. The frame can then wrap around the cover element, so that only the terminal contacts for the plate are free. Alternately, a cover element can be set on only one surface, according to the invention. A plate made of a hardened metal can be arranged on the other side, for example. These types of metal plates prevent an X-ray to detect the arrangement of tracks underneath; they protect the holes, and the metal can prevent spot-drilling, under normal conditions in any case.

With the invention, it is possible to provide completely new types of plates with safety-sensitive modules, in which the corresponding plate areas are covered with a cover element, with no possibility of lifting, drilling through, breaking through pr the like. The cover element will break into a large number of individual parts, so that tracks arranged on it will be destroyed in any case. Preferably, the tracks are produced by applying lacquer and so they tear directly with it. But thin embedded tracks are also damaged at the site. The tracks can be brought into contact with the plates in many ways, for example using piezoelectric, optoelectronic or other elements or even simply by purely surface contacts. Elements that work mechanically can also be used to determine a change in distance between the cover element and the plate. In the event that the plate or tracks are lifted off or damaged, immediate measures are taken to delete the data that must be protected. Thus, power outages can take place or delete software can be started directly. The sensitive data can also be overwritten by relevant data.

The invention can be widely used in a simple, economical way, and it makes the electronic circuits much more secure.

BRIEF DESCRIPTION OF THE DRAWINGS

Other advantages and features of the invention will become clear from the following description with the figures.

FIG. 1 shows a schematic perspective drawing of one example of embodiment of the invention;

FIG. 2 shows a sectional view along line II—II in FIG. 1 and

FIG. 3 shows a detailed view of detail III in FIG. 1.

DETAILED DESCRIPTION OF THE PREFERRED EMBODIMENT

The same reference numbers are used for the same elements in the figures.

The plate 1 shown as an example in the figures has a circuit 4 known in and of itself, and a connecting strip 3, which is suitable for a data bus system, for example. In the example of embodiment shown, the plate 1 has a frame 5, which runs around the circuit area to be protected on its so-called mounting side. The frame 5 is made of the plastic material of which the plate 1 is made. FIG. 3 shows that the frame 5 has conductors 9 going through it, so that they are damaged and/or short-circuited if the frame is spot-drilled or if there is damage due to an attempt to lift it up.

The edge 6 of a cover 2 is set on the frame 5. The cover 2 is made of a hard, and at the same time brittle material and has tracks 7 going through it, which are on the side facing the plate or are embedded in the material of the cover 2. Combinations are also possible. The edge 6 of the cover 2 is set on the frame 5 of the plate 1. The plate 1 and the cover 2 together form a hermetically protected space in which the modules to be secured are arranged.

The cover 2 is attached to the plate 1 by the usual means, not shown, such as frame elements, clamps, adhesive and/or the like.

FIG. 3 shows a detail in which contacts 8 are arranged on the frame 5. Tracks of the conduit 7 of the cover 2 are set on these contacts 8 and attached by mounting. They can thus be detected when there is any lifting.

In FIG. 2, the back of the plate 1 is covered with a metal plate 11, so that the purely circuit side, also called the soldered side, of the plate 1 is protected. Instead of the metal plate 1, which is separated from the plate 1 by an insulating layer 10 in the example of embodiment shown, a cover 2 can also be arranged.

The basic element in the form of embodiment of the invention is the cover 2, which is made of hard and at the same time brittle, preferably pre-stressed, hence tempered material. Even the smallest damage causes the cover 2 to break into a large number of small elements, so conduits are cut through with high security, and corresponding follow-up measures are taken. The follow-up measures are deleting the writable memory so that the information can be neither read or nor manipulated.

The example of embodiment described is only used for the explanation and is not limiting.

What is claimed is:

1. A device for protecting electronic circuits from unauthorized access comprising: at least one continuous cover element, arranged on a circuit plate to cover a portion of the circuit plate, the cover element being pre-stressed to increase an internal stress and being made of a material that is hard and brittle so as to induce breakage thereof during the unauthorized access; and a first track connected to a detection circuit to detect a mechanical damage.

2. The device in claim 1, wherein the cover element is made of glass.

3. The device in claim 1, wherein the first track is arranged on a side of the cover element.

4. The device in claim 3, wherein the first track is contac with a component of the circuit plate.

5. The device in claim 1, wherein the circuit plate comprises a frame for mounting the cover element.

6. The device in claim 5, wherein the frame includes a second track for detecting the mechanical damage.

7. The device in claim 1, wherein the cover element is attached to the plate by means of a plastic frame.

8. The device in claim 1, wherein the cover element is arranged on a first surface of the circuit plate and a second cover element is arranged on a second surface of the circuit plate.

9. The device in claim 1, wherein the cover element is arranged on a first surface of the circuit plate, and a metal plate is attached to a second surface of the circuit plate.

10. The device in claim 8, wherein the first surface and the second surface are disposed opposite one another on the circuit plate.

11. The device in claim 9, wherein the first surface and the second surface are disposed opposite one another on the circuit plate.

* * * * *

UNITED STATES PATENT AND TRADEMARK OFFICE
CERTIFICATE OF CORRECTION

PATENT NO.   : 6,355,316 B1
DATED        : March 12, 2002
INVENTOR(S)  : Miller et al.

It is certified that error appears in the above-identified patent and that said Letters Patent is hereby corrected as shown below:

Column 1,
Line 8, before "OF" delete "BACKGROUD" and insert therefor -- BACKGROUND --
Line 14, after "for" delete "the"

Column 2,
Line 26, after "ensures" delete "that"

Column 3,
Line 11, after "through" delete "pr" and insert therefor -- or --
Line 32, after "description" delete "with" and insert therefor -- of --
Line 47, after "data" delete "bus"and insert therefor -- base --

Column 4,
Line 23, before "nor" delete "or"
Line 40, after "is" delete "contac" and insert therefor -- in contact --

Signed and Sealed this

Twenty-first Day of June, 2005

JON W. DUDAS
*Director of the United States Patent and Trademark Office*